United States Patent
Yamada et al.

(10) Patent No.: US 7,788,003 B2
(45) Date of Patent: Aug. 31, 2010

(54) REMOTE TROUBLESHOOTING SYSTEM

(75) Inventors: Hideyuki Yamada, Hiroshima (JP);
Hiroyuki Takahashi, Hiroshima (JP);
Shinya Yamasaki, Hiroshima (JP)

(73) Assignee: Mazda Motor Corporation (JP)

( * ) Notice: Subject to any disclaimer, the term of this patent is extended or adjusted under 35 U.S.C. 154(b) by 706 days.

(21) Appl. No.: 11/808,624

(22) Filed: Jun. 12, 2007

(65) Prior Publication Data
US 2007/0299575 A1 Dec. 27, 2007

(30) Foreign Application Priority Data
Jun. 22, 2006 (JP) .............................. 2006-172956

(51) Int. Cl.
G01M 17/00 (2006.01)
G05B 23/02 (2006.01)
G06F 17/30 (2006.01)

(52) U.S. Cl. ............................... 701/29; 701/2; 701/33; 701/35; 340/539.24

(58) Field of Classification Search .................. 701/29, 701/2, 33, 35, 123; 340/539.24; 702/34; 705/27, 35; 700/110
See application file for complete search history.

(56) References Cited

U.S. PATENT DOCUMENTS

| | | | |
|---|---|---|---|
| 5,566,092 A | 10/1996 | Wang et al. | |
| 7,203,560 B1 * | 4/2007 | Wylie et al. | 700/110 |
| 7,266,515 B2 * | 9/2007 | Costello et al. | 705/27 |
| 2002/0087238 A1 | 7/2002 | Matsui | |
| 2002/0103582 A1 * | 8/2002 | Ohmura et al. | 701/33 |
| 2002/0103583 A1 | 8/2002 | Ohmura et al. | |
| 2003/0014219 A1 | 1/2003 | Shimizu et al. | |

FOREIGN PATENT DOCUMENTS

| | | |
|---|---|---|
| EP | 1 229 320 | 8/2002 |
| WO | WO 2004/049161 | 6/2004 |

OTHER PUBLICATIONS

European Search Report Application EP 07 01 1399 dated Sep. 17, 2007.

* cited by examiner

Primary Examiner—Tan Q Nguyen
(74) Attorney, Agent, or Firm—Studebaker & Brackett PC; Donald R. Studebaker

(57) ABSTRACT

A remote troubleshooting system comprises a vehicle that transmits vehicle data regarding a stress factor of a specific onboard component at a specified timing, and a troubleshooting server that is connected to the vehicle via a network, receives the vehicle data from the vehicle, and performs the troubleshooting of the onboard component. The server determines a precaution level based on the vehicle data from the vehicle, selects a troubleshooting program that is suitable to the precaution level determined, and transmits this to the vehicle. The vehicle replaces the troubleshooting program currently stored by a memory with the troubleshooting program received. Thereby, the reliability of the troubleshooting can be improved.

8 Claims, 14 Drawing Sheets

FIG. 5

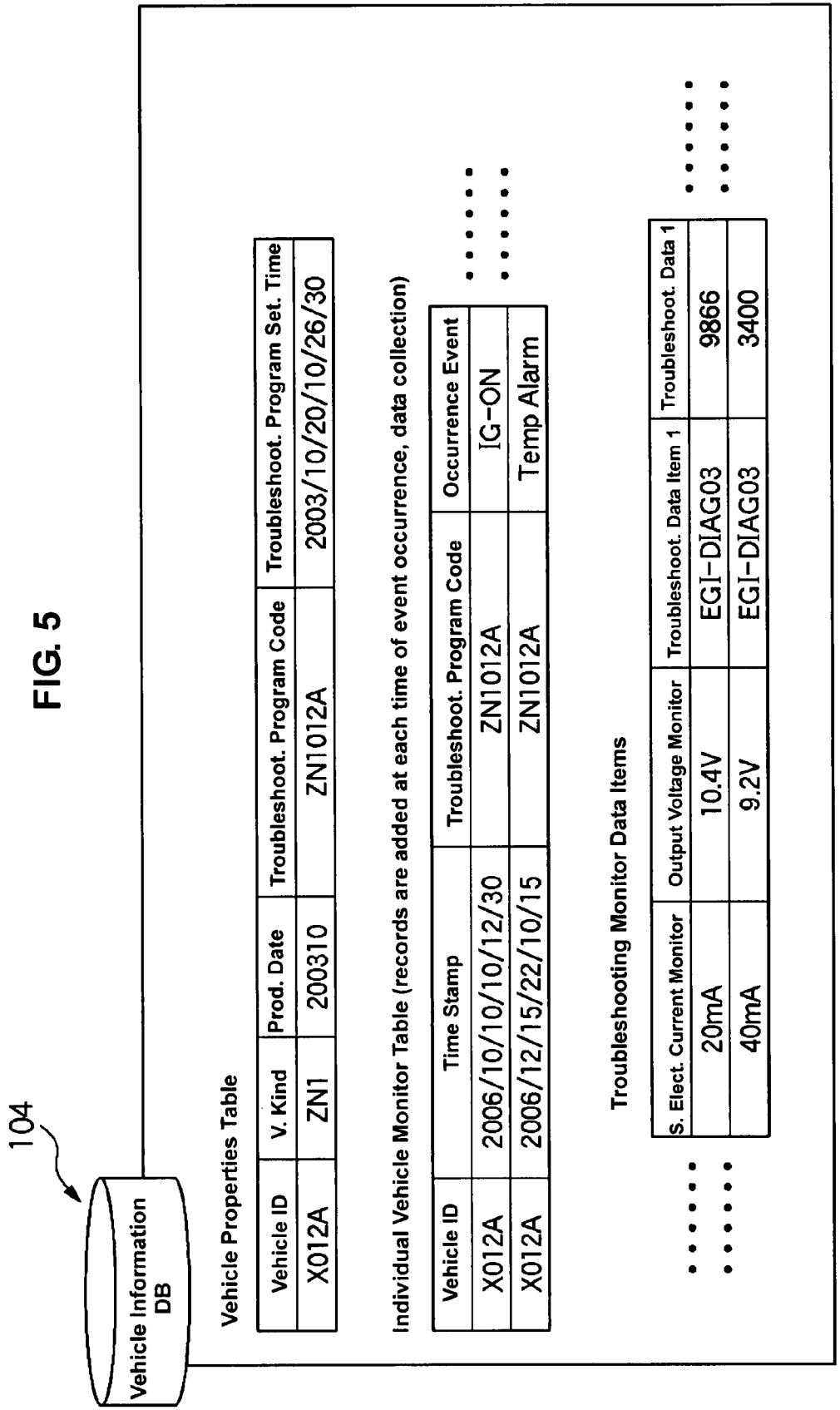

Vehicle Properties Table

| Vehicle ID | V. Kind | Prod. Date | Troubleshoot. Program Code | Troubleshoot. Program Set. Time |
|---|---|---|---|---|
| X012A | ZN1 | 200310 | ZN1012A | 2003/10/20/10/26/30 |

Individual Vehicle Monitor Table (records are added at each time of event occurrence, data collection)

| Vehicle ID | Time Stamp | Troubleshoot. Program Code | Occurrence Event | ... |
|---|---|---|---|---|
| X012A | 2006/10/10/10/12/30 | ZN1012A | IG-ON | ... |
| X012A | 2006/12/15/22/10/15 | ZN1012A | Temp Alarm | ... |

Troubleshooting Monitor Data Items

| ... | S. Elect. Current Monitor | Output Voltage Monitor | Troubleshoot. Data Item 1 | Troubleshoot. Data 1 | ... |
|---|---|---|---|---|---|
| ... | 20mA | 10.4V | EGI-DIAG03 | 9866 | ... |
| ... | 40mA | 9.2V | EGI-DIAG03 | 3400 | ... |

104 — Vehicle Information DB

FIG. 7

Precaution Line Setting Table

| Vehicle Kind | Troubleshoot. Monitor Data | L-Precaution Value | U-Precaution Value | L-Trouble Deter. Value | U-Trouble Deter. Value |
|---|---|---|---|---|---|
| ZN1 | | 10mA | 70mA | 1mA | 100mA |

Precaution Level Setting Table

| Vehicle Kind | Level | Travel. Distance | IG Frequency | E. Speed Precaution Frequency | Temperature Precaution Frequency | Humidity Precaution Frequency | Vibration Precaution Frequency |
|---|---|---|---|---|---|---|---|
| ZN1 | A | 50000 | 100000 | 1000 | 10000 | 10000 | 100000 |
| ZN1 | B | 100000 | 150000 | 5000 | 50000 | 50000 | 200000 |
| ZN1 | C | 150000 | 200000 | 10000 | 100000 | 100000 | 1000000 |

Vehicle-kind Reliability Prediction Table

| Vehicle Kind | Unit ID | Precaution Level | MTTF |
|---|---|---|---|
| ZN1 | EGIO | A | 1000000 |
| ZN1 | EGIO | B | 500000 |
| ZN1 | EGIO | C | 300000 |

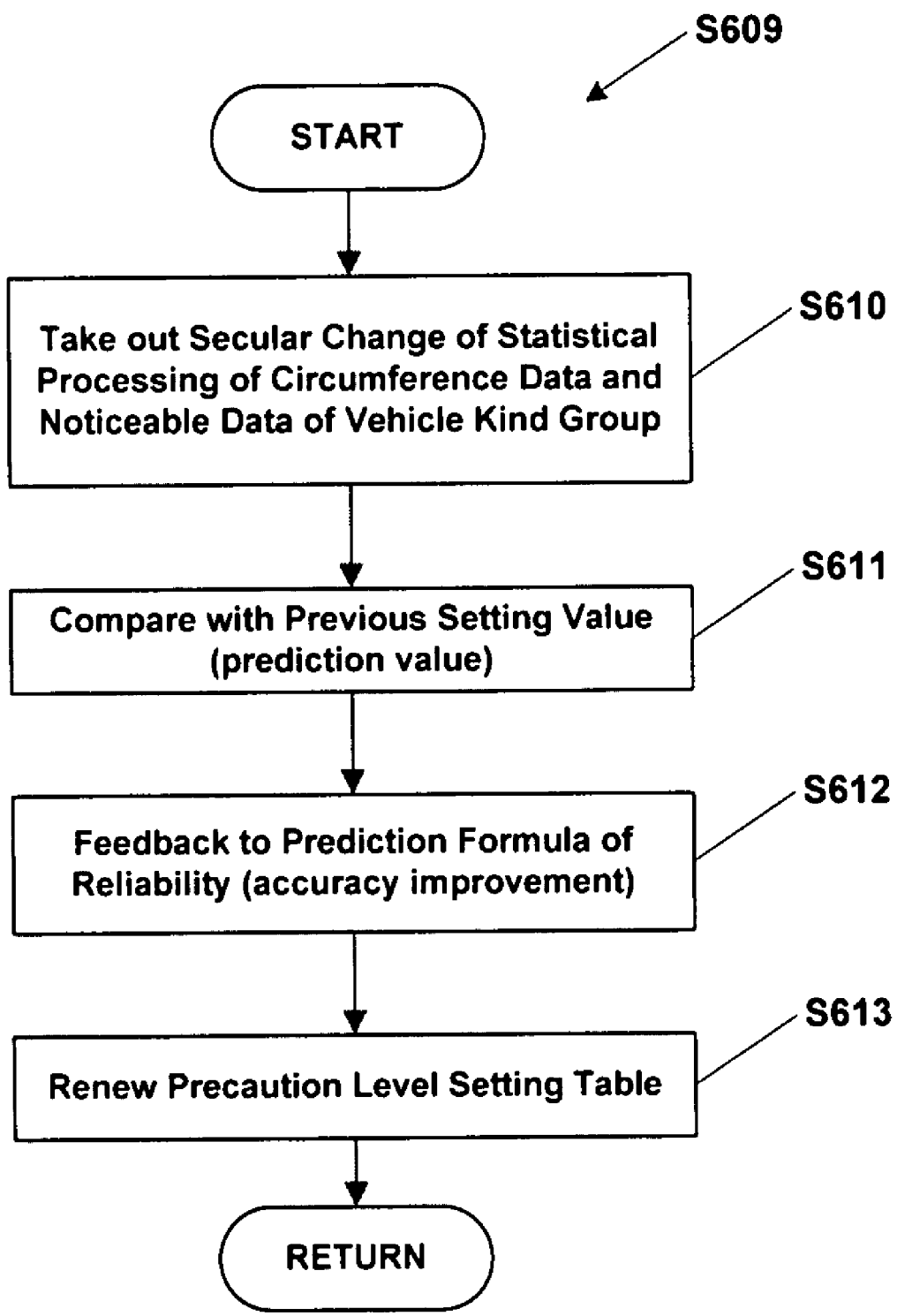

REMOTE TROUBLESHOOTING SYSTEM

BACKGROUND OF THE INVENTION

The present invention relates to a remote troubleshooting system to conduct a troubleshooting of a vehicle.

Automotive vehicles are equipped with many electronic devices that install high-density electric components therein. Recently, semiconductor components that can perform even in a considerably high temperature circumference for installation in an engine room have been used.

Herein, in general, performance characteristics or reliability function of such semiconductor components are just based on prediction of the reliability of a sample component that is conducted before their mass production. Namely, the product screening, such as a circumference resistance test, or a reliability test, before shipping is not conducted to all of products. Meanwhile, car production companies do not conduct tests to each of the supplied components either.

Accordingly, there may occur some performance deterioration or trouble of electric components after introduction of the vehicles equipped with the components into markets to a certain extent. In particular, a likelihood rate of the trouble occurrence may increase in a case where the semiconductor components are used in a circumference of abnormally sever usage conditions. Especially, change of the user's usage circumference, usage conditions, usage term, usage frequency of an automotive vehicle is relatively large, so the trouble occurrence rate of the vehicle-onboard semiconductor components in the markets may be expected to be higher than that of other components.

Meanwhile, many reports of deterioration or trouble regarding an O2 sensor have been made as a problem of the engine control characteristics. This problem generally occurs more often when the engine load condition change rapidly, i.e., at a transient driving condition, compared to a stable engine load condition. This means that if traveling data of vehicles in a traveling situation where the trouble occurrence rate is high can be collected from many vehicles at real timing, a proper prediction of trouble occurrence and an indication of causes of troubles may be expected.

From this viewpoint, various types of troubleshooting technology of vehicles have been proposed.

US Patent Application Publication No. 2002/0103583 A1 discloses a troubleshooting system that is coupled to a vehicle via a network to conduct a troubleshooting to portions having trouble. Herein, the system is remotely connected to the vehicle, so a vehicle's user can conveniently know if the vehicle has any problem, or portions having trouble without bringing the vehicle into a service shop.

Also, US Patent Application Publication No. 2002/0087238 A1 discloses a vehicle management system, in which learned values such as air-fuel ration, ignition timing, are accumulated in a data base, and an abnormality is determined when the learned values get out of their normal range and then notified to a user or the like before any actual trouble has occurred to the vehicle. Thus, the condition of each vehicle can be managed properly, thereby preventing of the trouble occurrence in advance.

Stress factors that may cause any trouble of the semiconductor component of an automotive vehicle may comprise a heat shock, a heat cycle, a power cycle, a humidity, a vibration, and so on. The stress factors may cause an increase of a leak electric current due to deterioration of connecting portions in a semiconductor chip, deterioration of an eclectic connection on a soldering surface of terminals, increase of a contact resistance due to a mechanical breakage, and eventually bring up malfunction of a unit itself.

Especially, an inside of the engine room of a vehicle, i.e., heat, vibration, humidity, would provide a rather sever circumference to the semiconductor components. Accordingly, remote monitoring of circumference changing with checking of characteristics of an electric control unit (ECU) may contribute greatly to an early finding of troubles or a prediction of trouble occurrence.

SUMMARY OF THE INVENTION

The present invention has been devised in view of the above-described matters, and an object of the present invention is to provide a remote troubleshooting system that can improve a reliability of troubleshooting properly.

According to the present invention, there is provided a remote troubleshooting system for performing troubleshooting of an onboard component of a vehicle using a troubleshooting server, wherein the vehicle comprises a memory to store a first troubleshooting program that is enable to be rewritten and a control processor unit to control a transmission of vehicle data regarding a stress factor of a specific onboard component of the vehicle to the troubleshooting server at a specified timing by processing the first trouble shooting program stored in the memory, the troubleshooting server is connected to the vehicle via a network, receives the vehicle data from the vehicle, and performs the troubleshooting of the onboard component, the troubleshooting server comprises a determining device to determine a precaution level regarding the troubleshooting of the onboard component based on the vehicle data from the vehicle, a memory device to store a plurality of troubleshooting programs that are in accordance with the precaution level, and a transmitting device to select a second troubleshooting program from the plurality of troubleshooting programs stored and transmit the second troubleshooting program to the vehicle, the selected second troubleshooting program being suitable to the precaution level determined, and the vehicle further comprises a renewal device to replace the first troubleshooting program stored by the memory with the second troubleshooting program transmitted by the transmitting device of the troubleshooting server.

According to the present invention, the statistical troubleshooting based on the vehicle data regarding the stress factor that might cause troubles during the vehicle traveling or the like can be attained. Thereby, the accurate troubleshooting can be provided.

According to a preferred embodiment of the present embodiment, the vehicle data regarding the stress factor includes an atmosphere temperature and an atmosphere humidity of a circumference of the onboard component and an vibration frequency of the onboard component. Thereby, the stress factor can be precisely predicted with these data.

According to another preferred embodiment of the present embodiment, the vehicle data regarding the stress factor includes information of a kind of the vehicle, and the troubleshooting server performs a statistical processing by the kind of the vehicle based on the vehicle data. Thereby, any secular deterioration of the onboard component that might be difficult to predict by an individual vehicle can be predicted properly.

According to another preferred embodiment of the present embodiment, the plurality of troubleshooting programs are configured so as to have the vehicle transmit the vehicle data with a specified frequency that is in accordance with the precaution level. Herein, it is preferable that the plurality of troubleshooting programs are configured so as to have the vehicle transmit the vehicle data more frequently when the precaution level is higher. Thereby, the frequency of the transmission of the vehicle data can be increased as the precaution level becomes higher, so the time any trouble of the onboard component occurs can be determined more precisely.

According to another preferred embodiment of the present embodiment, the troubleshooting server is configured to accumulate the vehicle data from the vehicle and further comprises a changing device to change a threshold for determining the precaution level by the determining device based on the vehicle data accumulated. Herein it is preferable that the changing device is configured to change the threshold based on a statistical processing of the vehicle data accumulated. Thereby, the threshold for determining the precaution level can be optimized based on the vehicle data accumulated, so the precise determination of the precaution level can be attained.

According to another preferred embodiment of the present embodiment, the vehicle further comprises a device for guiding of vehicle's entering to a service shop and/or making order of an onboard component based on the precaution level determined by the determining device. Thereby, the user can recognize what to do easily, so the troubleshooting can be further improved.

Other features, aspects, and advantages of the present invention will become apparent from the following description which refers to the accompanying drawings.

BRIEF DESCRIPTION OF THE DRAWINGS

FIG. 5 is a diagram showing an exemplified data that is stored at a vehicle information DB according to the embodiment.

FIG. 7 is a diagram showing an exemplified data that is stored at a troubleshooting DB according to the embodiment.

FIG. 15 is a flowchart showing details of a determination value renewal processing by a vehicle kind according to the embodiment.

DETAILED DESCRIPTION OF THE INVENTION

Hereinafter, a preferred embodiment of the present invention will be described referring to the accompanying drawings. The present invention should not be limited to the below-described embodiment, which just exemplifies the preferable specific example.

Figure 1:
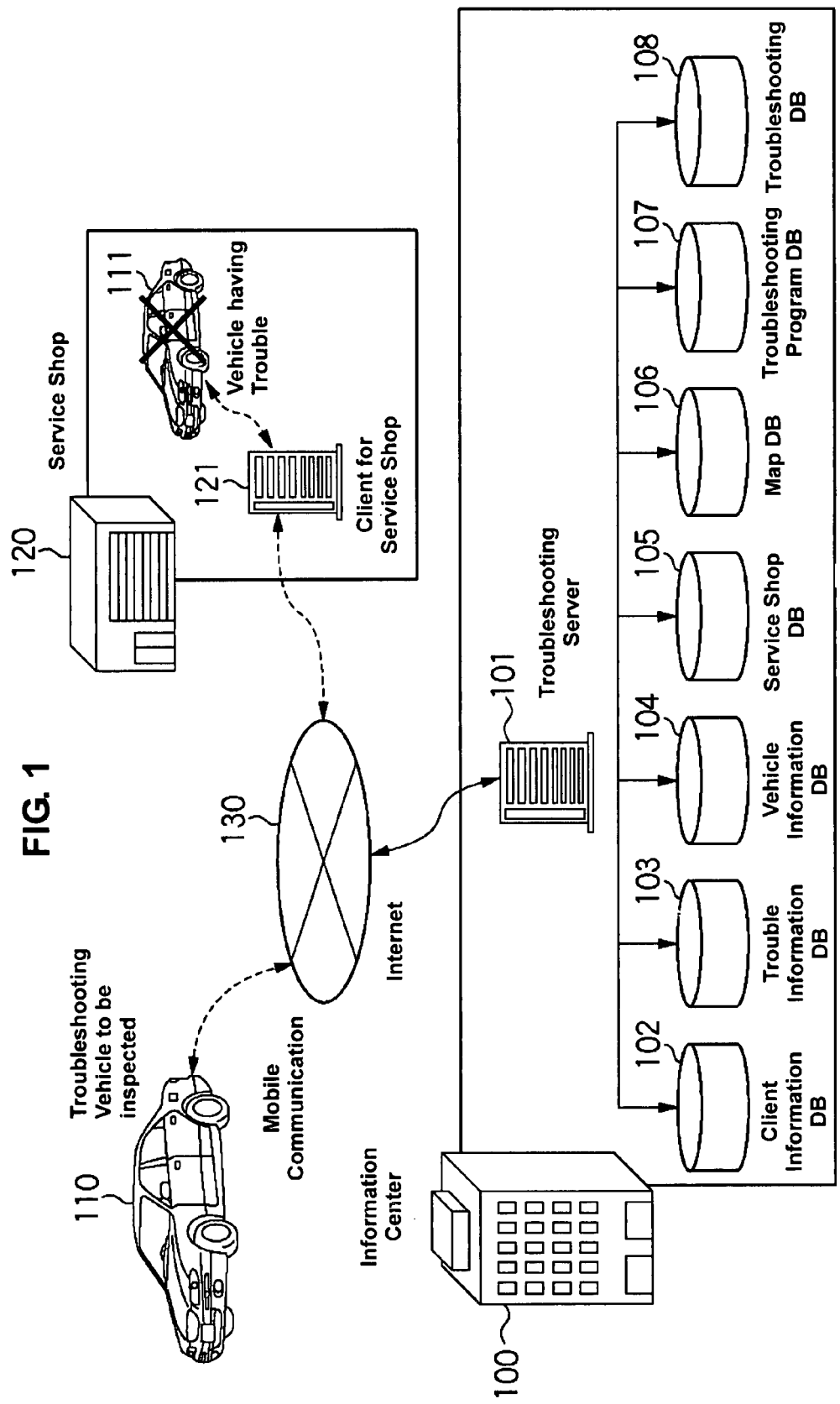
FIG. 1 is a diagram showing an exemplified constitution of a remote troubleshooting system according to an embodiment.

FIG. 1 is a diagram showing an exemplified constitution of a remote troubleshooting system according to the present embodiment. An information center 100, which comprises some computers, accumulates various information that is transmitted by user vehicles 110, 111, a service shop 120 and so on, and provides results of troubleshooting. The information center 100 is connected to the user vehicle 110 and the service shop 120 via an internet 130, a mobile communication line, or the like.

The user vehicles 110, 111 get various data necessary for troubleshooting and transmit the data to the information center 100.

The service shop 120, which is a shop for repairing or the like, reads out the vehicle data from the trouble vehicle 111 and transmits information regarding trouble portions or trouble causes to the information center 100. At the service shop 120 is provided a client device 121 for the service shop. The client device 121, which is a kind of computer, comprises a CPU (control processor unit), a memory, a hard disk drive, a communication interface, and so on.

The information center 100 comprises a troubleshooting server 101 to execute a troubleshooting processing. The troubleshooting server 101 is configured so as to conduct reading out and writing in (saving) to information that is stored in data bases (DB) 102-108 described below.

A user information data base (DB) 102 stores information of users (all users or contractors of a troubleshooting service).

Figure 4:
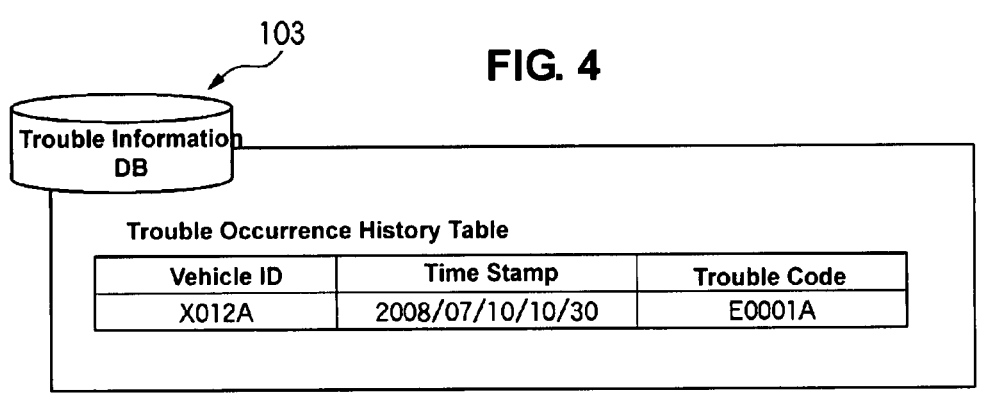
FIG. 4 is a diagram showing an exemplified data that is stored at a trouble information DB according to the embodiment.

A trouble information data base 103 accumulates a table of trouble-occurrence history shown in FIG. 4 based on the trouble data from the vehicle 111 and the client device 121 of the service shop 120.

A vehicle information data base 104 accumulates a table of vehicle properties and a table of individual vehicle monitor shown in FIG. 5 based on the trouble data from the user vehicles 110, 111.

A service shop data base 105 stores information regarding a location of the service shop and the like. A map data base 106 stores map data.

Figure 6:
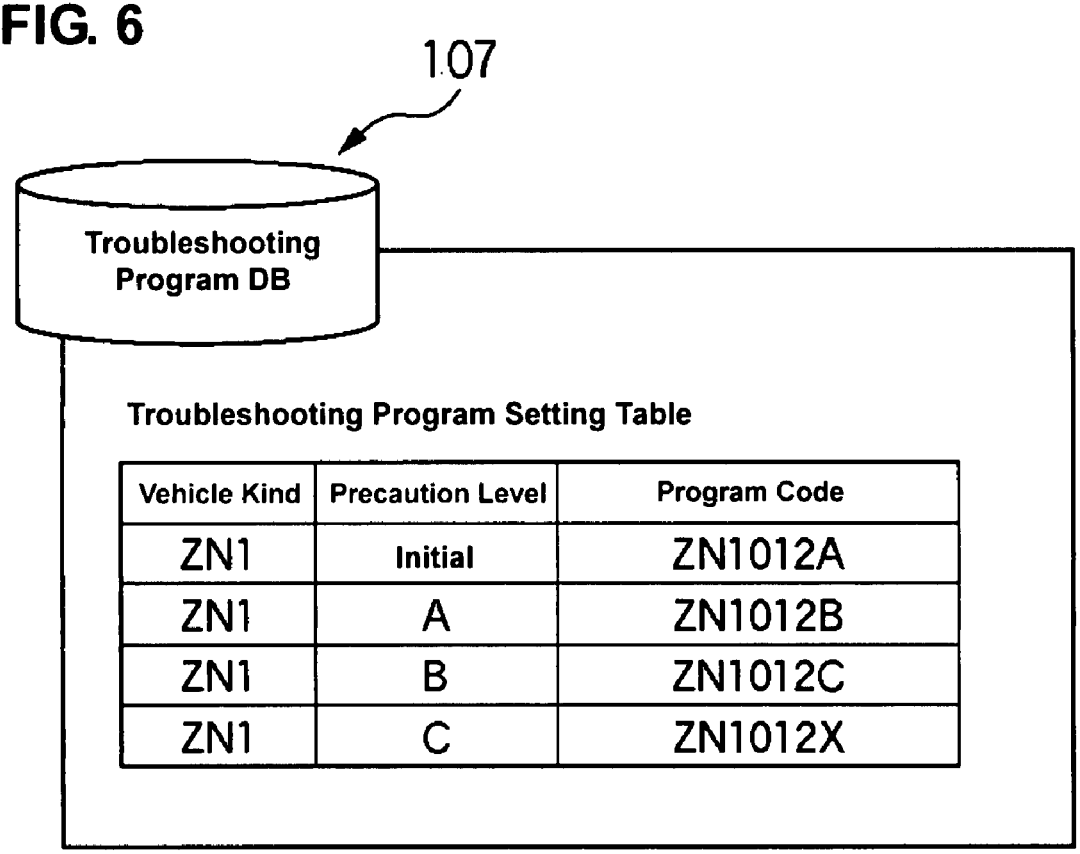
FIG. 6 is a diagram showing an exemplified data that is stored at a troubleshooting program DB according to the embodiment.

A troubleshooting program data base 107 memorizes a setting table of troubleshooting shown in FIG. 6 which describes a plurality of troubleshooting programs. Contents of the troubleshooting programs differ from each other in accordance with a precaution level. The precaution level will be described in detail later.

A troubleshooting data base 108 accumulates a precaution line setting table that describes the precaution line by the vehicle kind with respect to some noticeable troubleshooting data (troubleshooting monitor data), a precaution line setting table that prescribes contents of respective precaution levels by the vehicle kind, and a vehicle-kind reliability prediction table that prescribes relationships between the respective precaution levels and MTTF (an average initial trouble time) by the vehicle kind, as shown in FIG. 7.

The troubleshooting server 101, which is a kind of computer, comprises a CPU (control processor unit), a memory, a hard disk drive, a communication interface, and so on. In the following descriptions, various types of processing are executed by the CPU executing programs that correspond to flowcharts.

Figure 2:
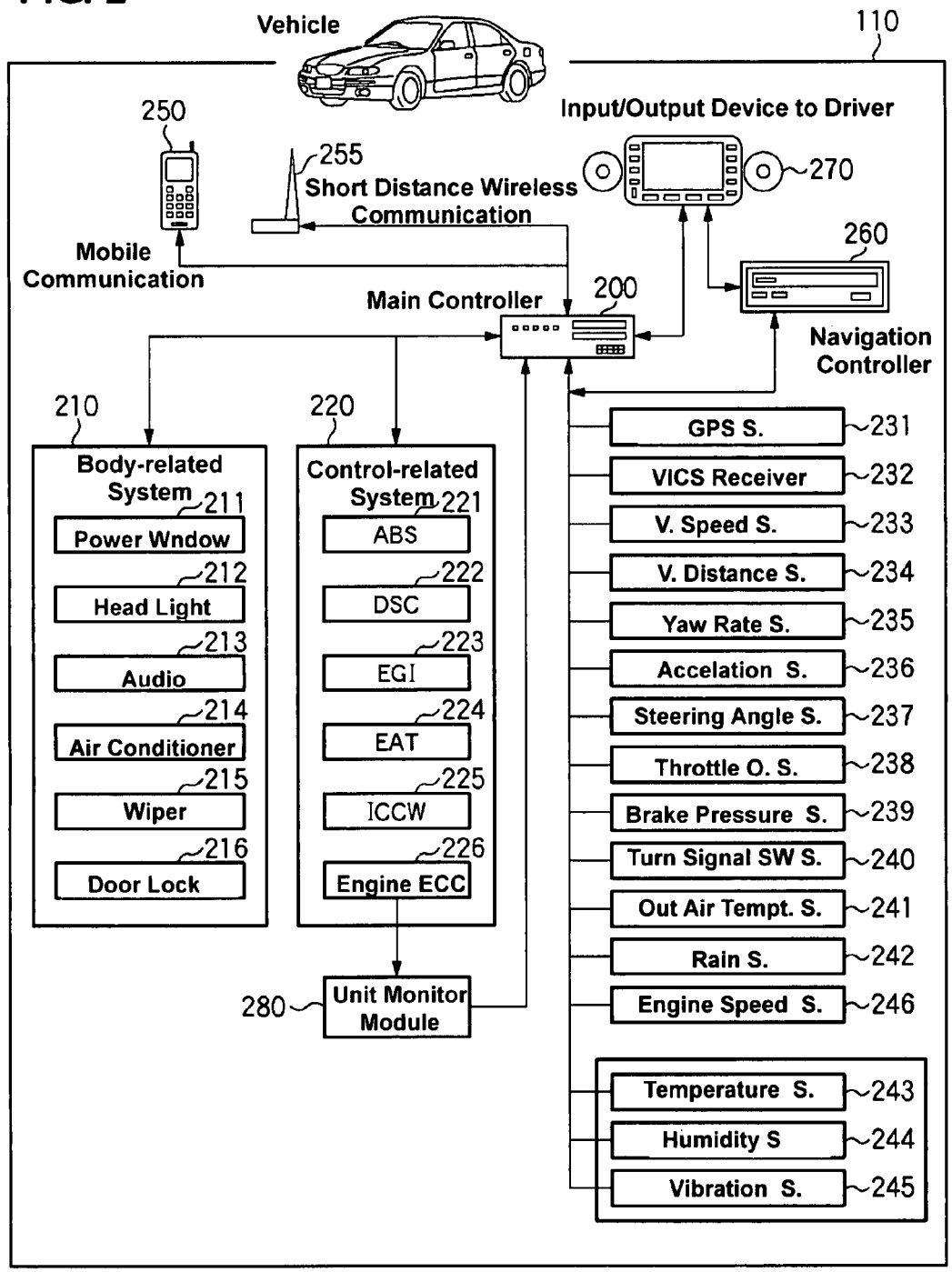
FIG. 2 is a block diagram showing an exemplified constitution of a vehicle according to the embodiment.

FIG. 2 is a block diagram showing an exemplified constitution of the vehicle 110 according to the present embodiment. A main controller 200, which comprises a CPU, a memory and so on, gets control data and sensor outputs from control units and sensors, accumulates them in its memory, transmits the accumulated information to the information center 100 via a mobile terminal (mobile communication interface) 250 or a short-distance wireless communication interface 255, and receives trouble prediction results from the information center 100. The short-distance wireless communication interface 255 may adopt a wireless LAN, a Bluetooth, a wireless standard for ETC, or the like.

A body-related system 210 comprises a power window unit 211, a headlight unit 212, an audio unit 213, an air condition unit 214, a wiper unit 215, a door lock unit 216 and so on, and outputs data such as control results, electric current, voltage, to the main controller 200.

A control-related system 220 comprises an ABS (antilock brake system) 221 to control to prevent brake locking, a DSC (dynamic stability controller) 222 to control vehicle movements, an EGI (electric gas injection) 223 to control a fuel supply, an EAT (electric automatic transmission) 224 to control an automatic transmission, and an ICCW (intelligent cruise control & warning) 225 to assist a driver for auto-cruising and the like, and provides the main controller 200 with control results and the like. The control-related system 220 of the present embodiment further comprises an engine ECU 226 to control an engine provided in an engine room.

The vehicle is equipped with various sensor, such as a GPS (global positioning system) sensor 231 to receive a radio wave from GPS satellites and determine a current position of the vehicle, a VICS information receiver 232 to receive traffic congestion information and the like, a vehicle speed sensor 233 to detect a vehicle speed, a distance sensor 234 to detect a distance between the vehicle and another vehicle traveling in front, for instance, a yaw rate sensor 235 to detect a yaw rate of the vehicle, an acceleration sensor 236 to detect an acceleration of the vehicle, a steering angle sensor 237 to detect a steering angle of the vehicle, a throttle opening sensor 238 to detect an opening of a throttle, a brake pressure sensor 239 to detect a pressing pressure of a brake, a turn signal SW sensor 240 to detect an operation of a turn signal switch, an outside-air temperature sensor 241 to detect a temperature of outside air, a rain sensor 242 to detect a rainfall or its amount, an engine speed sensor 246 to detect an engine speed. In addition, there are provided in the engine room of the present embodiment a temperature sensor 243 to detect an atmosphere temperature of a circumference of the engine ECU 226 that may be a stress factor of the ECU 226, a humidity sensor 244 to detect an atmosphere humidity of the circumference of the engine ECU 226 that may be another stress factor of the ECU 226, and an vibration sensor 245 to detect an vibration frequency of the engine ECU 226 that may be further another stress factor of the ECU 226.

The main controller 200, which conducts a comprehensive control of the above-described body-related system and control-related system based on outputs of the sensors coupled thereto, further conducts troubleshooting processing of some particular control units of the control-related system 220. In the present embodiment, the troubleshooting of the engine ECU 226 is conducted based on the outputs of the temperature sensor 243, humidity sensor 244, vibration sensor 245 and so on, for instance in addition, at the vehicle 110 is provided a unit monitoring module 280 to monitor a source electric current and an output voltage of the engine ECU 226 and the like. Its monitoring data is supplied to the main controller 200.

A navigation controller 260 performs retrieval of map information stored in a hard disc drive or the like based on the data from the GPS sensor 231 and indicates the current location of the vehicle on the map. An input-output device 270 for the user driver includes an indication device such as liquid-crystal display, a voice output device and so on, and outputs the map data from the navigation controller 260 and the troubleshooting results from the information center 100.

Figure 8:
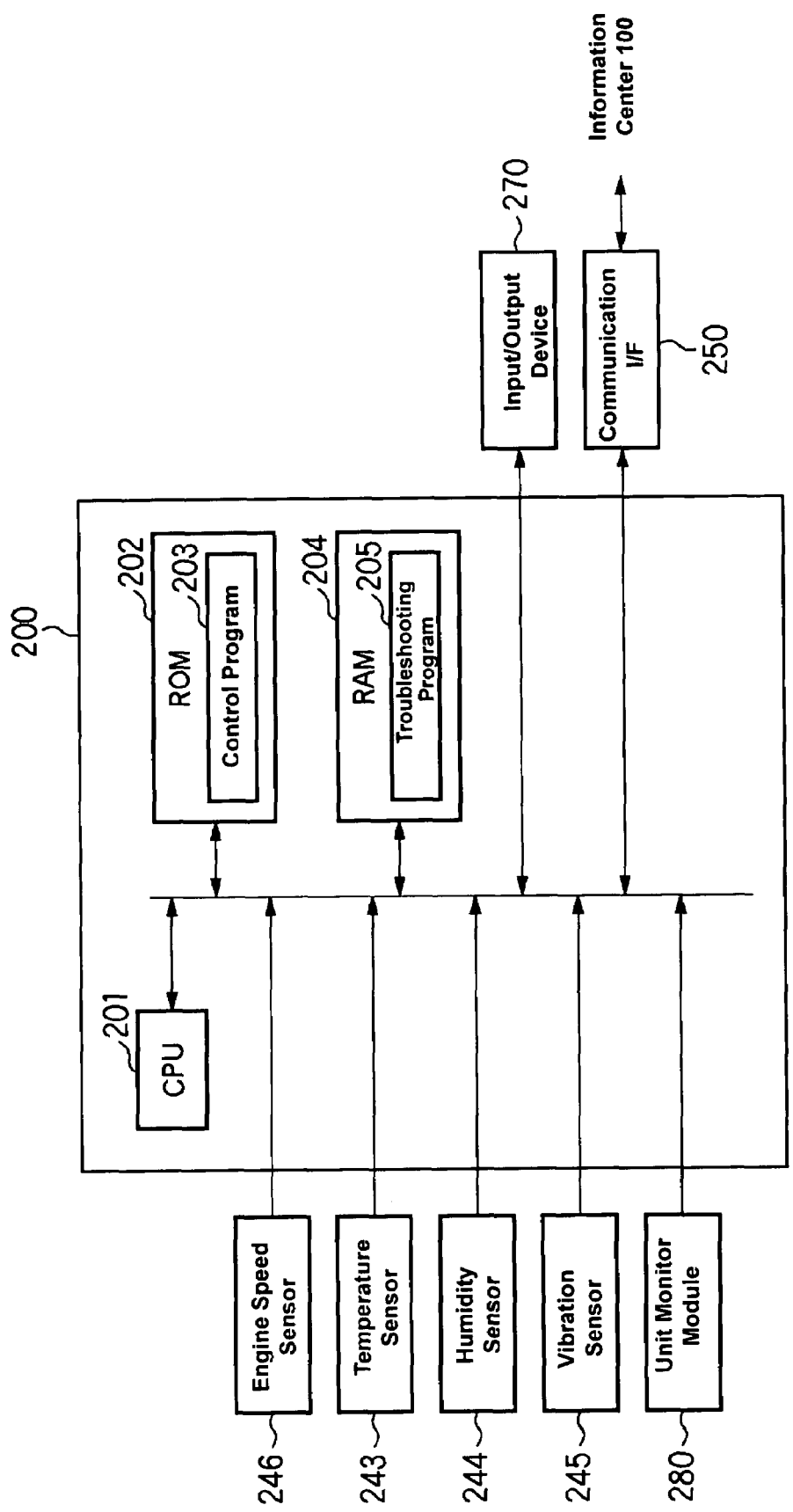
FIG. 8 is a block diagram showing a hardware constitution of a main controller for troubleshooting according to the embodiment.

FIG. 8 is a block diagram showing a hardware constitution of the main controller 200 for troubleshooting according to the present embodiment. As shown in the figure, the main controller 200 comprises a CPU 201 to perform thereof, a ROM 202 to memorize (store) programs and data, a RAM 204 to provide work area of the CPU 201 and save programs and data that are enable to be rewritten (i.e., replaceable), and a communication interface (I/F) 250 (or a short-distance wireless communication I/F 255) to perform communications with the information center 100. The ROM 202 memorizes a control program 203, and the CPU 201 executes the control program 203, thereby performing as the main controller. The RAM 204 saves (stores) a troubleshooting program 205.

The troubleshooting program 205 is read out during execution of the control program 203 and the troubleshooting of the vehicle is conducted, which will be described later. This troubleshooting uses the output signals of the temperature sensor 243, humidity sensor 244, vibration sensor 245, engine speed sensor 246, and the signal from the unit monitoring module 280. These signals are transmitted to the information center 100 at a specified timing. The troubleshooting results are indicated by the input-output device 270. The troubleshooting program is forwarded from the information center 100 at needs in the execution of the control program 203 by the CPU 201. In this case, the troubleshooting program in the RAM 204 is replaced by the above-described forwarded troubleshooting program.

Figure 3:
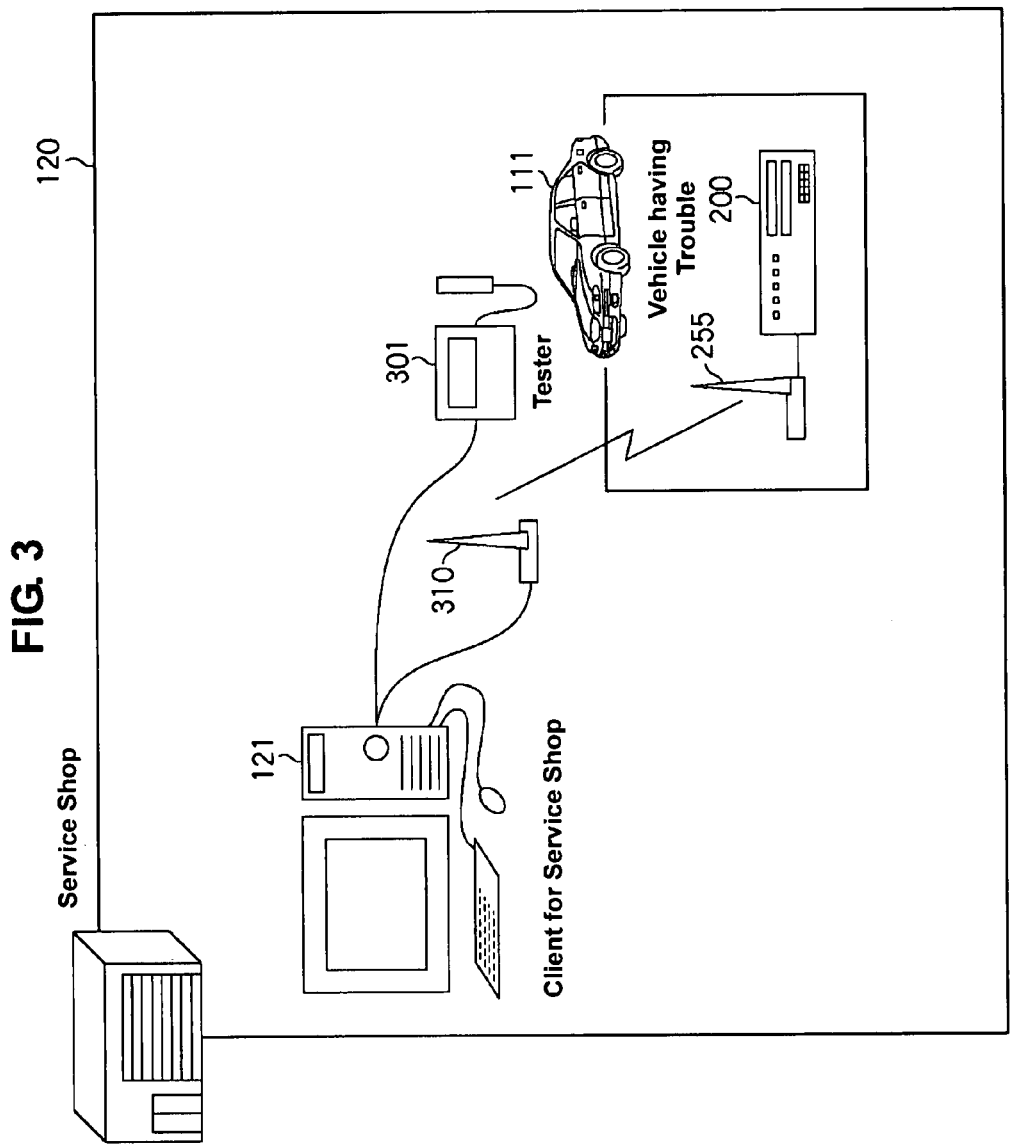
FIG. 3 is a diagram showing an exemplified constitution of a service shop according to the embodiment.

FIG. 3 is a diagram showing an exemplified constitution of the service shop 120. The client device 121 for the service shop is a computer that reads out the troubleshooting information from a tester 301 and previous vehicle data before occurrence of troubles that has been accumulated in the main controller 200 on the vehicle 111 having troubles and transmits those to the information center 100 along with troubleshooting codes indicating the troubles occurred. Herein, the client device 121 for the service shop also comprises an communication interface for communication with the information center 100. When communicating with the vehicle, it can be connected to the vehicle 111 via a short-distance wireless communication interface 310, for instance. The tester 301 is a device that, can conduct specific troubleshooting by being connected to a connecter of the vehicle having troubles.

Figure 9:
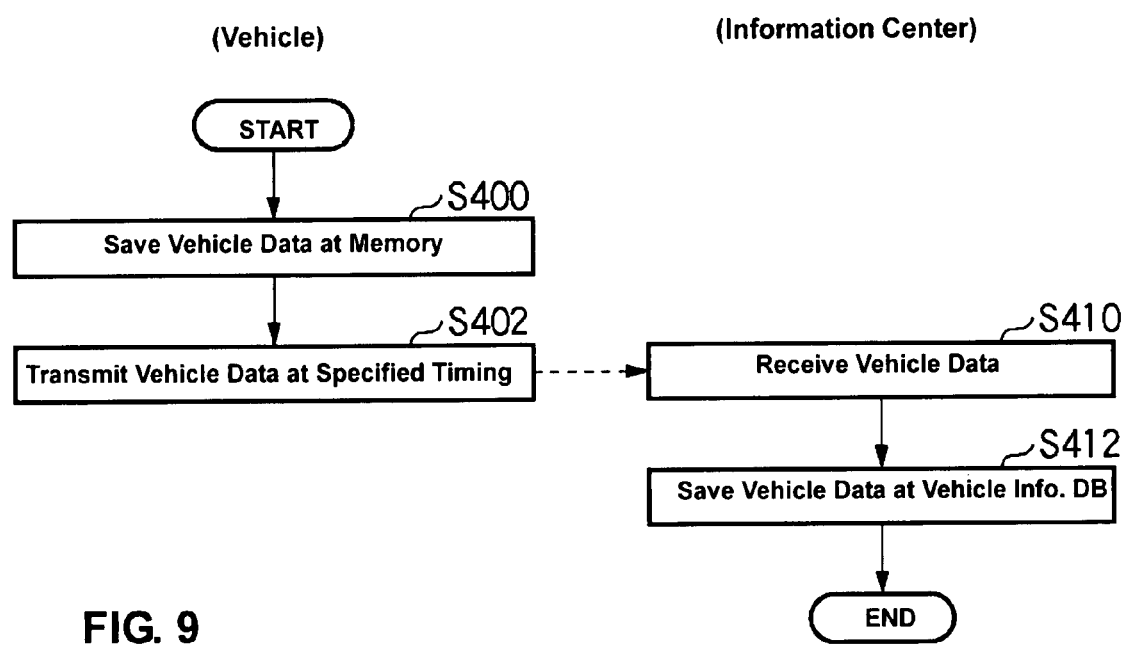
FIG. 9 is a flowchart regarding collection of the vehicle data according to the embodiment.

FIG. 9 is a flowchart regarding collection of the vehicle data according to the present embodiment. In the flowchart, the vehicle data including data of vehicles having no trouble is collected, and the vehicle information data base 104 is renewed. According to this processing, a statistical data collection of the vehicles having no trouble can be conducted, so it may become easier to find out features of data of the vehicles having troubles, thereby providing the precious troubleshooting. In the flowchart of the figure, the program corresponding to a vehicle-side flowchart is included in the troubleshooting program 205, which is executed by the CPU 201.

Initially, in a step S400, the CPU 201 of the main controller 200 gets the outputs of the temperature sensor 243, humidity sensor 244, vibration sensor 245, engine speed sensor 246 and unit monitoring module 280, which are shown in FIG. 8, at proper timing, and saves those in the RAM 204 as the vehicle data. Herein, the vehicle data includes a traveling distance and a frequency of switch on of an ignition (IG), not illustrated.

Next, in a step S402, the CPU 201 of the main controller 200 reads out the vehicle data memorized in the RAM 202 at a specified timing, attaches a vehicle ID and a time stamp to the read vehicle data, and transmits these to the information center 100 via the mobile communication interface 250 or the short-distance wireless communication interface 255.

Figure 10:
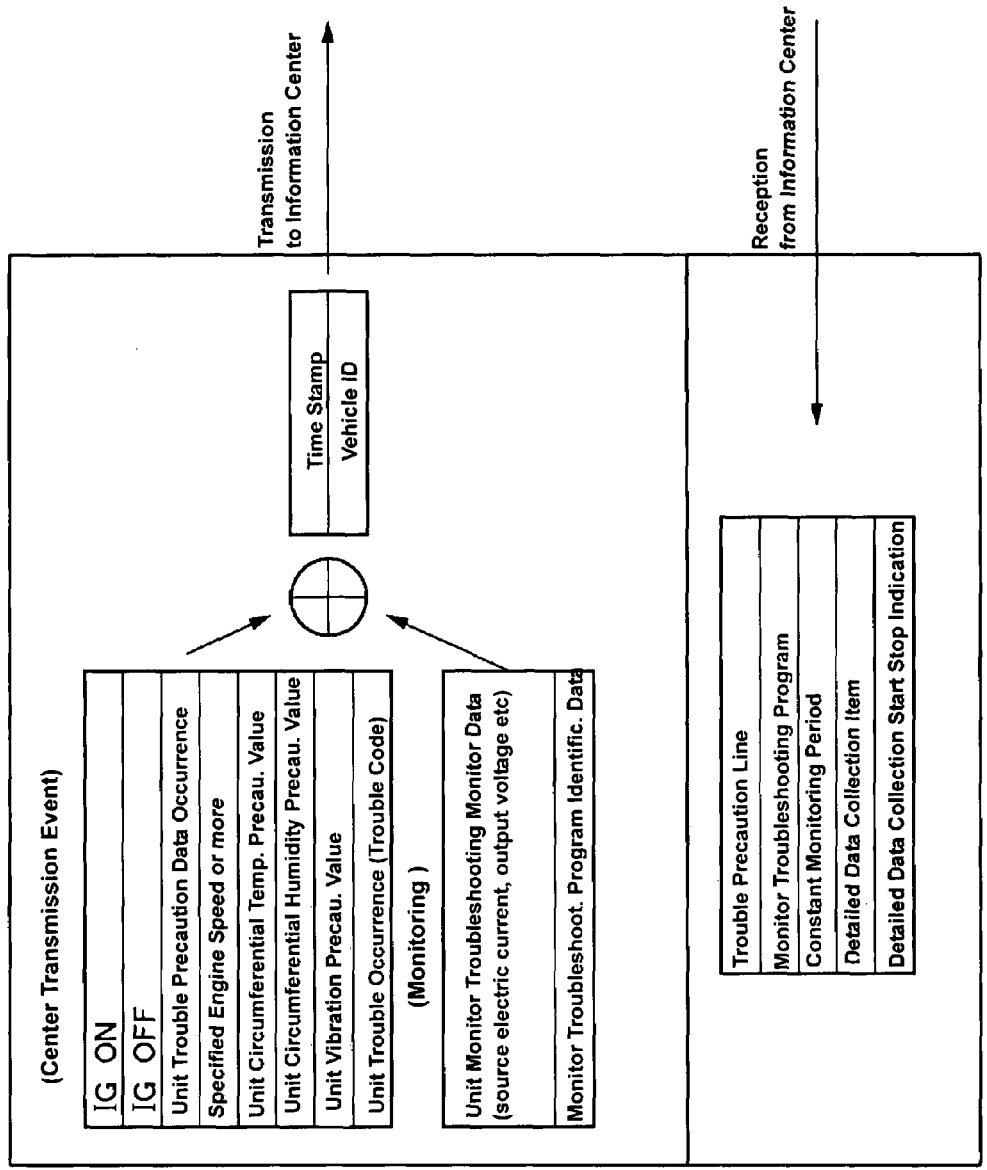
FIG. 10 is an explanatory diagram of an exemplified data communication that is conducted between the vehicle and an information center according to the embodiment.

The above-described specified timing may be when a center transmission event occurs as shown in FIG. 10, for instance. The center transmission event may comprise events of ignition (IG) ON/OFF, occurrence of the unit trouble precaution data from the unit monitoring module 280, indication of the engine speed detected by the sensor 246 of a specified speed or higher, indication of the temperature (unit circumferential temperature) detected by the sensor 243 of a precaution value, indication of the humidity (unit circumferential humidity) detected by the sensor 244 of a precaution value, indication of the vibration frequency detected by the sensor 245 of a precaution value, occurrence of the unit trouble data from the unit monitoring module 280, and the like. Moreover, the above-described specified timing may include a timing that corresponds to a monitoring timing of the source electric current or the output voltage of the engine ECU 226 by the unit monitoring module 280. The CPU 201 transmits respective data corresponding to the events in response to these events to the information center 100 along with the vehicle ID and time stamp.

Next, in step S410, the troubleshooting server 101 of the information center 100 receives the vehicle data from the vehicle via the mobile communication interface or the like. Then, in step S412, the troubleshooting server 101 additionally saves the received vehicle data at the vehicle information data base 104 (specifically, the individual vehicle monitor table shown in FIG. 5) in associated with the vehicle ID contained in the data.

Figure 11:
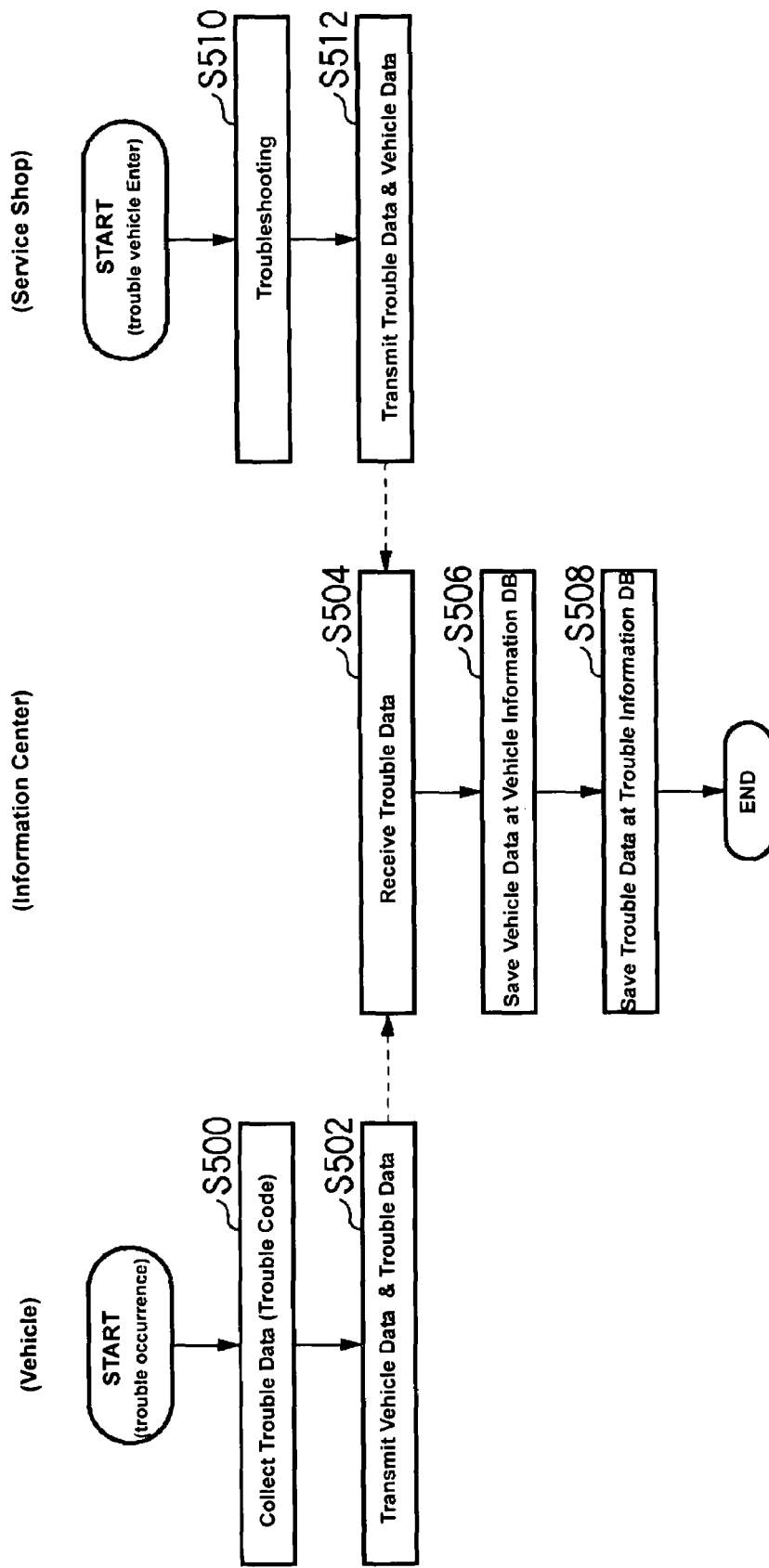
FIG. 11 is a flowchart regarding collection of trouble data used for the troubleshooting according to the embodiment.

FIG. 11 is a flowchart regarding collection of trouble data used for the troubleshooting. There may be two ways of collecting the trouble data basically. One of them is a way in which the trouble data is read out from the vehicle having trouble and is saved at the trouble information data base 103 (steps S500, S502). The other is a way in which the trouble data is read out from the vehicle having trouble 111 by the client device 121 of the service shop and saved at the trouble information data base 103 by the client device 121 (steps S510, S512).

In the step S500, when the transmission of the trouble data is requested by the user recognizing the trouble occurrence or the control devices detect the abnormality (for instance, when a warning lamp is turned on), the main controller 200 of the vehicle having trouble 111 reads out traveling conditions at the vehicle trouble, trouble occurrence time, vehicle number (vehicle body number), trouble identification code and so on from the RAM 202, and makes the trouble data. Herein, the trouble occurrence time and the trouble identification code may be inputted by the operation of the input/output device 270 by the user. A trouble code corresponding to the warning lamp and the like may be inputted. Useful information to identify vehicles such as the vehicle number may be obtained from data memorized in the ROM 202, for instance.

In a case where the main controller 200 has the troubleshooting program, the main controller 200 can get the data from the sensors and units and monitor the trouble occurrence all the time, periodically or at the specified timing (e.g., switch operation timing), by executing the troubleshooting program. Then, when detecting the trouble occurrence, the main controller 200 determines the traveling conditions, trouble occurrence time and the trouble indication code corresponding to the trouble occurring and makes trouble data, and then uploads them to the information center 100.

In the step S502, the main controller 200 transmits the vehicle data and the trouble data that are memorized in the RAM 202 to the troubleshooting server 101 of the information center 100. The troubleshooting server 101 receives the vehicle data and the trouble data via the internet 130 in step S504. Then, in step S506, the troubleshooting server 101 saves the received vehicle data at the vehicle information data base 104 (see FIG. 5). The troubleshooting server 101 saves the received trouble data at the trouble information data base 103 in step S508 (see FIG. 4).

In the way described above, the trouble data and the vehicle data as determination factors for troubleshooting are accumulated at the data bases. The trouble data and the vehicle data may be called a trouble, model, and this trouble model is changeable all the time by the data continually added in a data mining method, and it may be determined when comparing to another data. In this sense, processing of the troubleshooting server 101 registering the received trouble data and vehicle data at the respective data bases 103 and 104 or processing of the server 101 taking out some needed vehicle data may correspond to processing of making the trouble model.

Herein, the trouble data and the vehicle data may be collected from the service shop 120. In the step S510, the tester 301 is couple to the vehicle having trouble 111 and the troubleshooting is executed. Herein, the tester and/or the client device 121 read out the vehicle data memorized in the memory of the vehicle 111 and execute detailed investigations, or transmit a signal for a specified investigation to some units and investigates response data from the units, and thereby they make the trouble data.

Herein, the client device 121 for the service shop may be connected to the vehicle having trouble 111 via the wireless communication interface 310 and read out the vehicle data in the memory. In this case, this client device 121 may execute the troubleshooting program and conduct the detailed investigation to the trouble portions, thereby making the trouble data. In the step S512, the client device 121 for the service shop transmits the trouble data made and the vehicle data read out from the vehicle having trouble to the troubleshooting server 101 of the information center 100. Subsequently, processing of the step S504 and after are executed.

The two exemplified ways of collecting the trouble data has been described. The latter way can apply a rather valuable diagnostic device for the onboard device, so it may have an advantage of obtaining more specific investigation results.

Hereinafter, the remote troubleshooting that is conducted between the vehicle 110 and the troubleshooting server 101 of the present embodiment will be described.

A trouble mode of a semiconductor component is generally classified into three trouble types of "initial trouble", "accidental trouble" and "wear trouble" based on the trouble occurrence timing after its production. The initial trouble means a trouble that may be caused by any potential problem factor that has been unable to be screened perfectly before shipping. The accidental trouble means a trouble that may be caused by undesirable use conditions or an unexpected stress. The wear trouble means a trouble of malfunction that may be caused a physical deterioration via the stress accumulation, which can be expectable to a certain extent through a durability test at designing. Generally, after the usage term of products has passed the initial trouble term, a trouble occurring rate becomes the minimum under proper conditions for the semiconductor component, and as it approaches its design lifetime, the trouble occurring rate increases again. This change of the trouble occurring rate is generally called a "bathtub curve."

For the onboard semiconductor components for vehicles, the change of circumferential conditions of after shipping is large and the usage conditions change greatly depending on users, compared to other semiconductor components such as those for office supplies, for example. Accordingly, the trouble occurrence rate of the initial trouble or the accidental trouble of the vehicle-onboard semiconductor components may be expected to be higher than that of other semiconductor components.

Hence, it can be considered that the statistical collection of information taking account of lots of past usage conditions may facilitate determination as to whether a certain trouble is the initial trouble or the accidental trouble.

Further, in a case where the user continues to drive an automotive vehicle under sever conditions for onboard electric components, it can be expected that the wear trouble occurs early.

Even though the malfunction may not happen eventually, this wear trouble may possibly indicate different characteristics in its occurrence, which is like a so-called "previously noticeable phenomena," from those of the normal component.

Accordingly, if this "previously noticeable phenomena" could be detected at a properly initial timing by utilizing the past information accumulated statistically, an appropriate replacement of components may be conducted before occurrence of fatal troubles such as the malfunction.

According to the troubleshooting by the server 101 of the present embodiment, a precaution line before going to a trouble determining line is set, and a situation that is beyond this precaution line is recognized as the "previously noticeable phenomena." Moreover, the precaution level is determined based on the vehicle data, which will be described below. And, the troubleshooting program 205 of the main controller 200 of the vehicle 110 is renewed in accordance with the determination results of the precaution level. Herein, the precaution level setting table of the troubleshooting data base 108 shown in FIG. 7 is used for the determination of the precaution level, and this precaution level setting table is renewed based on the statistical processing of the vehicle data collected by the troubleshooting server 101 in order to improve its determination accuracy.

Figure 13:
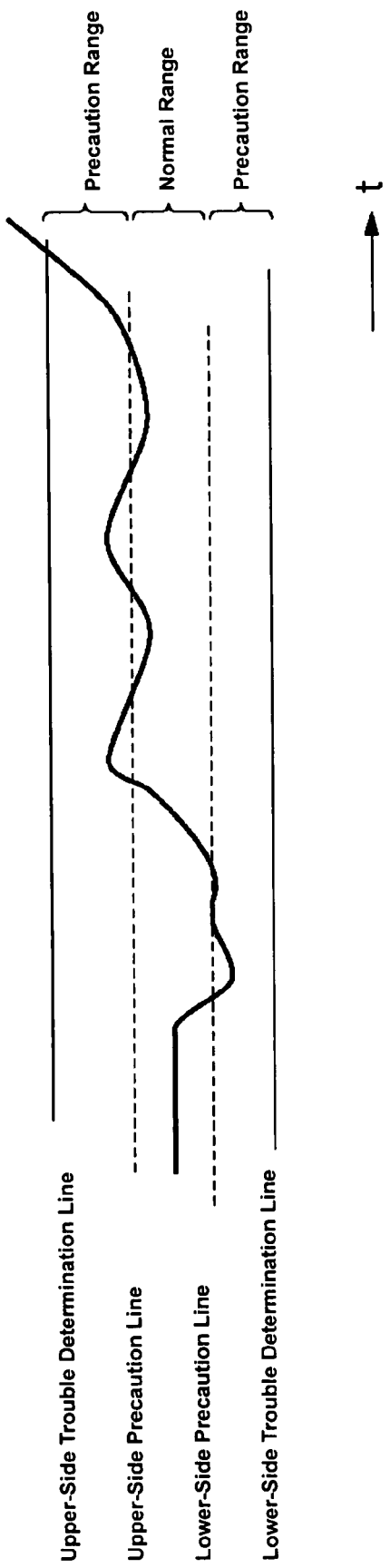
FIG. 13 is a diagram showing an exemplified graph of a secular change of the data to be inspected and an exemplified precaution line.

As described above, the vehicle data is accumulated at the vehicle information data base 104 each time the center transmission event occurs at each vehicle. Herein, by taking out a noticeable data (for example, the source electric current of the engine ECU 226) among the vehicle data for a specified vehicle, the secular change of the noticeable data can be followed. And, by taking an average of that for a specified vehicle kind, the statistical secular change of the noticeable data by the vehicle kind can be obtained. FIG. 13 is a diagram showing an exemplified graph of the secular change of such noticeable data. A monitor value changes up and down repeatedly and goes toward the trouble determination line as shown in this figure.

In the present embodiment, between an upper-side trouble determination line and a lower-side trouble determination line are provided an upper-side precaution line and a lower-side precaution line so as to divide into a normal range and a precaution range as shown. Specifically, values for the lines are set in the precaution line setting table of the troubleshooting data base 108 shown in FIG. 7. Herein, when the noticeable data gets out of the normal range between the upper-side precaution line and the lower-side precaution line, it is determined that that data is in the range of precaution.

Figure 12:
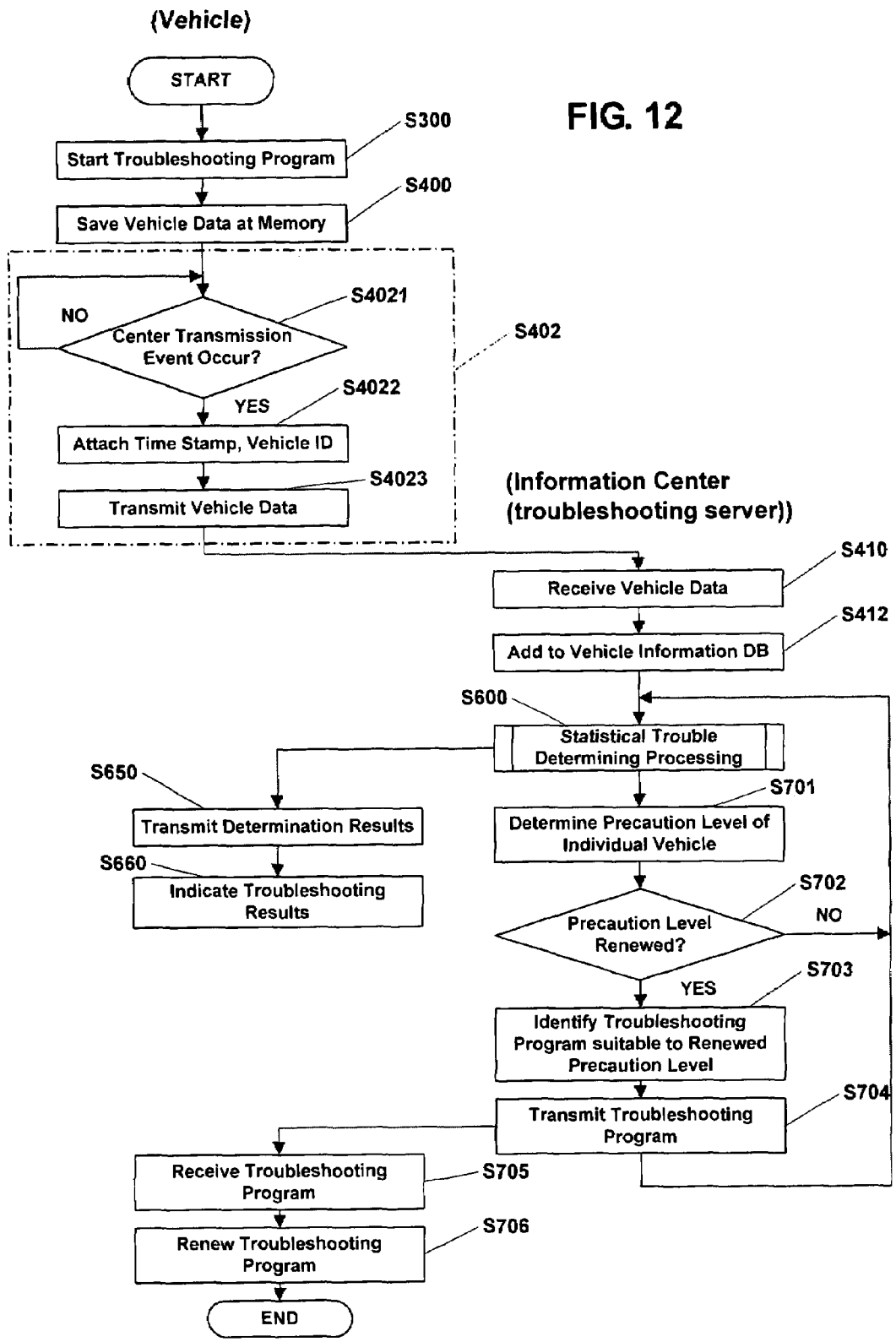
FIG. 12 is a flowchart showing a remote troubleshooting processing according to the embodiment.

FIG. 12 is a flowchart showing the remote troubleshooting processing conducted between the vehicle 110 and the troubleshooting server 101 of the present embodiment. FIG. 12 shows the flowchart including the processing of FIG. 9. The program corresponding to the processing at the vehicle is included in the control program 203 and the troubleshooting program 205, which is executed by the CPU 201.

First, in executing the control program 203 at the vehicle 110, the troubleshooting program 205 is started by the operation of the user or at a predetermined timing (step S300), which executes processing if steps S400 and S402 shown in FIG. 9. Namely, in the step S400, the CPU 201 of the main controller 200 gets the outputs of the temperature sensor 243, humidity sensor 244, vibration sensor 245, engine speed sensor 246, unit monitoring module 280, and so on that are shown in FIG. 8 at respective proper timing, and saves them as the vehicle data at the RAM 204.

Next, in the step S402, the CPU 200 transmits the vehicle data memorized in the RAM 202 to the information center 100 at a specified timing. Specifically, it is determined in step S4021 whether the center transmission event exemplified in FIG. 10 occurs or not. When the center transmission event occurs, the CPU 200 attaches the time stamp and the vehicle ID to the vehicle data corresponding to the event (step S4022), and transmits the vehicle data with the time stamp and the vehicle ID to the information enter 100 (step S4023).

After receiving the vehicle data in step S410, the troubleshooting server 101 of the information center 100 adds the vehicle data to the vehicle information data base 104 (specifically, the individual vehicle monitor table shown in FIG. 5) (step S412).

Contents of the above-described processing is as described referring to FIG. 9. After the vehicle information data base 104 is renewed in the step S412, the troubleshooting server 101 executes a statistical trouble determining processing using the data base information (step S600).

Figure 14:
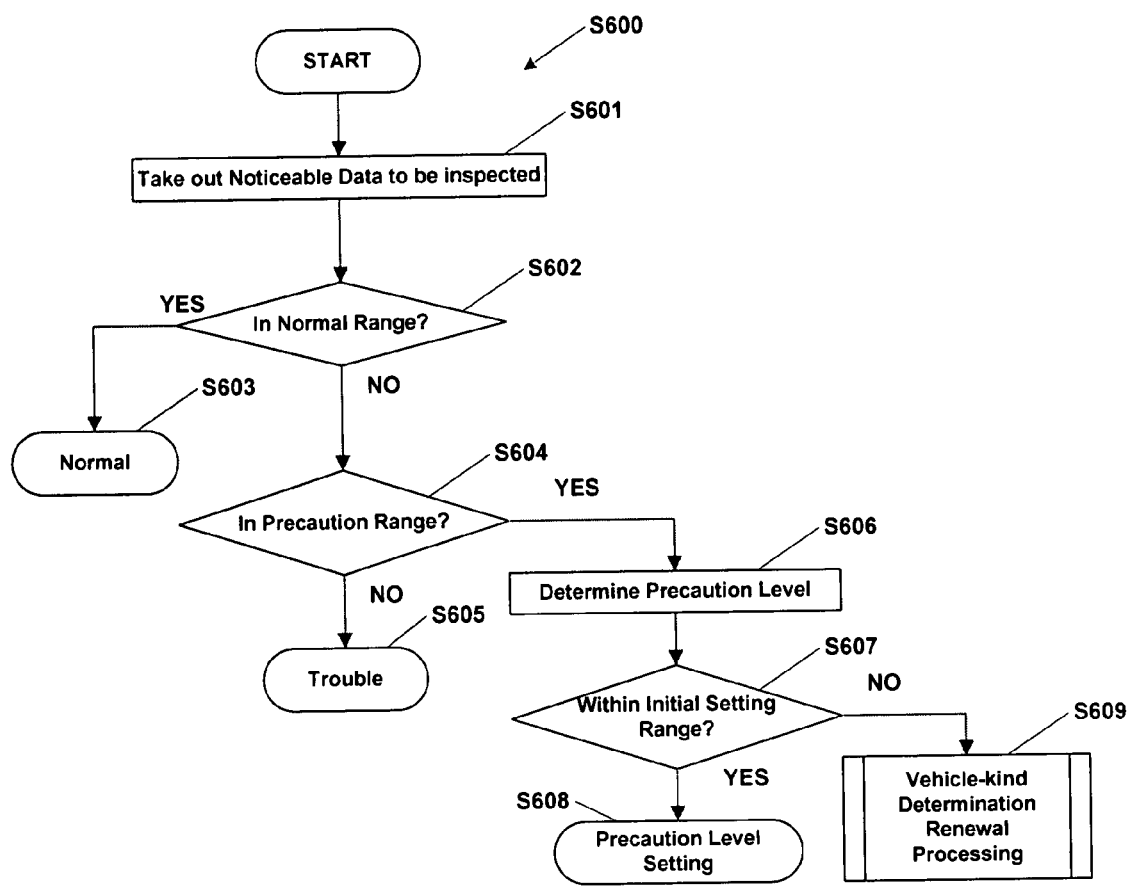
FIG. 14 is a flowchart showing details of a trouble determining processing executed by a troubleshooting server according to the embodiment.

FIG. 14 is a flowchart showing details of the trouble determining processing executed by the troubleshooting server 101 of the step 600.

First, the server 101 takes out the noticeable data to be inspected from the vehicle data with the vehicle ID of the vehicle 110 at the vehicle information data base 104 (step S601). Then, the server 101 determines whether the took-out noticeable date is between the lower-side precaution value and the upper-side precaution value, i.e., in the normal range (see FIG. 13), referring to the precaution line setting table of the troubleshooting data base 108 shown in FIG. 7 (step S602). When it is determined that the noticeable data is in the normal range, the engine ECU 226 to be inspected is determined to be normal (step S603).

Meanwhile, when the noticeable data is not in the normal range, the server 101 determines whether the noticeable date is between the lower-side precaution value and the lower-side trouble determination value or between the upper-side precaution value and the upper-side trouble determination value, i.e., in the precaution range (see FIG. 13) (step 604). When it is determined that the noticeable data is not in the precaution range, the engine ECU 226 to be inspected is determined to have a trouble (be out of order) (step S605). When the noticeable data is in the normal range, the server 101 determines the precaution level based on the vehicle data (circumference data) corresponding to the noticeable data, referring to the precaution level setting table of the troubleshooting data base 108 (step S606). In the example shown in FIG. 7, respective determination data of circumference data of a traveling distance, an IG frequency, an engine speed precaution frequency, a temperature precaution frequency, a humidity precaution frequency and an vibration precaution frequency are described in the precaution level setting table for precaution levels A, B and C, respectively. Herein, each described figure show a value that is less than the determination value for each precaution level. For example, in the circumference data of the traveling distance, it is determined that the precaution level is A when the traveling distance of the vehicle 110 is less than 50,000 km. Likewise, the precaution level B is determined when the traveling distance of the vehicle 110 is 50,000 km and more and less than 100,000 km. The precaution level C is determined when the traveling distance is 100,000 km or more and less than 150,000 km.

When the respective circumference data are within the initial setting range at their shipping (YES in step S607), a determined precaution level is set (step 608). Otherwise, a determination value renewal processing by vehicle kind is executed (step S609).

FIG. 15 is a flowchart showing details of a renewal processing of the determination value by the vehicle kind in the step S609.

Initially, the statistical processing of the circumference data and the noticeable data of the vehicle kind group are conducted to take out the secular change exemplified in FIG. 13 (step S610).

Next, a comparison with a previous setting value (predicted value), which is results of the change prediction corresponding to the future circumference change of the traveling distance, IG frequency, or the like, according to the vehicle circumference history, is conducted (step S611).

Then, a feedback to a prediction formula of reliability is conducted for improving the precaution level determination accuracy (step S612). This reliability prediction formula may be expressed as follows, for instance.

Long term changing of the noticeable data=a·F1 (traveling distance)+b·F2 (IG frequency)+c·F3 (engine speed)+d·F4 (temperature)+e·F5 (humidity)+f·F6 (vibration).

Herein, a-f are coefficients, and F1-F6 are functions of each circumference variable influencing changing of the noticeable data. A statistical analysis of the noticeable data and the circumference data from each vehicle is conducted, and the coefficients (a-f), which mean an influential degree of each circumference variable and have been set at the designing, are used, and thus the feedback is conducted so as to be suitable for the actual.

Subsequently, the renewal of the precaution level setting table is conducted (step S613). The precaution level is set at the "vehicle-kind reliability prediction table" in according to a degree of the possibility of future trouble occurrence. The precaution value for each precaution level of the circumference variables of the "precaution level setting table" is renewed in accordance with the influential degree of the circumference variables that is obtained by the feedback in the step S613.

Thus, a threshold for determining the precaution level is changed based on the vehicle data accumulated.

Returning to the flowchart of FIG. 12, after executing the trouble determination processing of the step S600, the troubleshooting server 101 transmits its trouble determination results (normal/trouble/precaution (and precaution level)) to the vehicle 110 (step S650).

The CPU 201 of the main controller 200 of the vehicle 110, which receives the trouble determination results from the troubleshooting server 101, indicates the results on a display, forming the input/output device 270 (step S660). In a case where the trouble determination results is "trouble" or "precaution", it may be preferable to display at the input/output device 270 a screen of guiding of vehicle's entering to service shops or making order of onboard components as well.

The troubleshooting server 101 executes the following processing in addition to the transmission processing of the trouble determination results (step S650) after the above-described step S600. Namely, it determines the precaution level set in the step S600 (step S701), when the precaution level is renewed (Yes, step S702), identifies the troubleshooting program that is suitable to the renewed precaution level, referring to the troubleshooting program setting table of the data base 107 shown in FIG. 6 (step S703), and transmits the identified troubleshooting program to the vehicle 110 (step S704). At the same time, it renews the "troubleshooting program code" and "troubleshooting program setting time" of the inspected vehicle that are saved at the table of vehicle properties (see FIG. 5) of the vehicle information data base 104.

The troubleshooting programs of the troubleshooting program table are configured so that the transmission timing of the vehicle data by the programs in the step S402 differs. For example, the troubleshooting programs are configured so as to have the vehicle transmit the vehicle data more frequently when the precaution level is higher.

After receiving the troubleshooting program from the server 101 (step S705), the CPU 201 of the main controller 200 of the vehicle 110 renews the programs by replacing the troubleshooting program 205 stored in the RAM 202 with this newly-received troubleshooting program (step S706).

According to the remote troubleshooting of the present embodiment described above, the accurate troubleshooting results are obtained by the statistical trouble determination with the vehicle data accumulated at the troubleshooting server 101, and the troubleshooting program 205 stored in the vehicle is renewed in accordance with the precaution level of each unit to be inspected. Accordingly, the troubleshooting based on the vehicle data regarding the stress factor that might cause troubles during the vehicle traveling can be attained. Thereby, the accurate prediction or indication of any trouble causes of the onboard components can be attained.

What is claimed is:

1. A remote troubleshooting system for performing troubleshooting of an onboard component of a vehicle using a troubleshooting server, wherein:

the vehicle comprises a memory to store a first troubleshooting program that is enable to be rewritten and a control processor unit to control a transmission of vehicle data regarding a stress factor of a specific onboard component of the vehicle to the troubleshooting server at a specified timing by processing the first trouble shooting program stored in the memory;

the troubleshooting server is connected to the vehicle via a network, receives the vehicle data from the vehicle, and performs the troubleshooting of the onboard component;

the troubleshooting server comprises a determining device to determine a precaution level regarding the troubleshooting of the onboard component based on the vehicle data from the vehicle, a memory device to store a plurality of troubleshooting programs that are in accordance with the precaution level, and a transmitting device to select a second troubleshooting program from the plurality of troubleshooting programs stored and transmit the second troubleshooting program to the vehicle, the selected second troubleshooting program being suitable to the precaution level determined; and the vehicle further comprises a renewal device to replace the first troubleshooting program stored by the memory with the second troubleshooting program transmitted by the transmitting device of the troubleshooting server.

2. The remote troubleshooting system of claim 1, wherein the vehicle data regarding the stress factor includes an atmosphere temperature and an atmosphere humidity of a circumference of the onboard component and an vibration frequency of the onboard component.

3. The remote troubleshooting system of claim 1, wherein the vehicle data regarding the stress factor includes information of a kind of the vehicle, and the troubleshooting server performs a statistical processing by the kind of the vehicle based on the vehicle data.

4. The remote troubleshooting system of claim 1, wherein the plurality of troubleshooting programs are configured so as to have the vehicle transmit the vehicle data with a specified frequency that is in accordance with the precaution level.

5. The remote troubleshooting system of claim 4, wherein the plurality of troubleshooting programs are configured so as to have the vehicle transmit the vehicle data more frequently when the precaution level is higher.

6. The remote troubleshooting system of claim 1, wherein the troubleshooting server is configured to accumulate the vehicle data from the vehicle and further comprises a changing device to change a threshold for determining the precaution level by the determining device based on the vehicle data accumulated.

7. The remote troubleshooting system of claim 6, wherein the changing device is configured to change the threshold based on a statistical processing of the vehicle data accumulated.

8. The remote troubleshooting system of claim 1, wherein the vehicle further comprises a device for guiding of vehicle's entering into a service shop and/or making order of an onboard component based on the precaution level determined by the determining device.

* * * * *